June 28, 1949.  T. P. BACON, JR  2,474,511
DEVICE FOR APPLYING NEW TREAD MATERIAL TO TIRES
Original Filed Dec. 7, 1942  4 Sheets-Sheet 1

Inventor
THOMAS P. BACON JR.
By George B. White
ATTORNEY.

June 28, 1949. T. P. BACON, JR 2,474,511
DEVICE FOR APPLYING NEW TREAD MATERIAL TO TIRES
Original Filed Dec. 7, 1942 4 Sheets-Sheet 3

Inventor,
THOMAS P. BACON JR.
By George B White
Attorney.

June 28, 1949. T. P. BACON, JR 2,474,511
DEVICE FOR APPLYING NEW TREAD MATERIAL TO TIRES
Original Filed Dec. 7, 1942 4 Sheets-Sheet 4

Inventor;
THOMAS P. BACON Jr.
George B. White
By Attorney.

Patented June 28, 1949

2,474,511

UNITED STATES PATENT OFFICE 2,474,511

DEVICE FOR APPLYING NEW TREAD MATERIAL TO TIRES

Thomas P. Bacon, Jr., Oakland, Calif.

Original application December 7, 1942, Serial No. 468,320, now Patent No. 2,422,652, dated June 24, 1947. Divided and this application May 29, 1945, Serial No. 596,527

5 Claims. (Cl. 154—9)

1

This invention relates to a device for applying new tread material to tires. This application is a division of my copending application Serial No. 468,320, filed December 7, 1942 now U. S. Patent No. 2,422,652, issued June 24, 1947, entitled Method for applying new tread material to tires.

An object of the invention is to provide a device whereby new tread material, in the form of so-called "camelback," can be so applied to the periphery of a tire that it is spread uniformly and securely across the entire tread width and all around the periphery of the tire, and is held there under suitable tension. The device provides for the applying of the camelback on an inflated tire by suitable rolling action while the tread surface of the tire is flattened to the full width of the camelback at the position where the camelback is applied under pressure, and the device also provides for accurate balancing of the tire before, during and after the application of the new tread material. The result is a tire with semi-cured rubber tread material held all around its tread periphery under suitable transverse and circumferential tension, and ready to be suitably cured to form the tread on the tire. This device may be employed in connection with new tires, as well as in retreading or recapping, as the case may be.

Another object of the invention is to provide a device whereby a strip of tread material can be quickly and efficiently attached to the periphery of a tire; the tire being inflated and truly balanced, the camelback being fed tangentially to one portion of the tire periphery at a time while the tire is rotated until the entire periphery of the tire is covered by the camelback; the tread surface of the tire being transversely flattened only where the camelback is tangentially applied to the tire so that the camelback is applied to a flat surface of the tire which is allowed subsequently to expand under the force of inflation, thereby holding the camelback under tension, both transversely and circumferentially; the camelback on the tire thus prepared is thereafter cured in any suitable manner to form the traction surface of the tire.

Another object of the invention is to provide a device which permits the convenient balancing of the tire so that it is truly balanced when the new tread material is applied to its periphery.

Another object of this invention is to provide a device for applying new tread material to tires which is highly useful and simple in construction. Convenience of arrangement, lightness and comparative inexpense of manufacture are further

2 objects which have been borne in mind in the production and development of the invention.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

The invention is clearly illustrated in the accompanying drawings, wherein.

Figure 1:
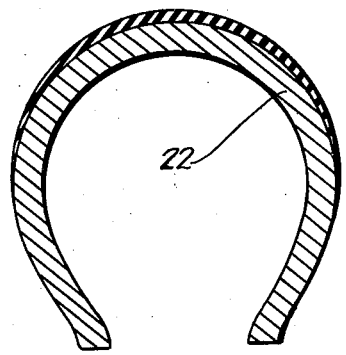
Fig. 1 is a cross section of the carcass of the tire, the tread surface of which is conveniently prepared for receiving the new rubber.
Figure 2:
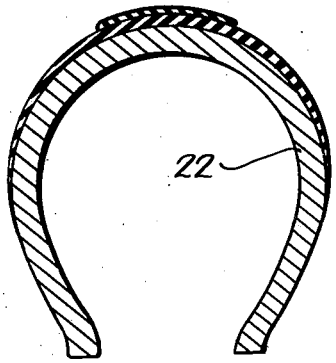
Fig. 2 is a sectional view of the tire, showing a smaller strip of new rubber applied to it for the purpose of balancing it.
Figure 3:
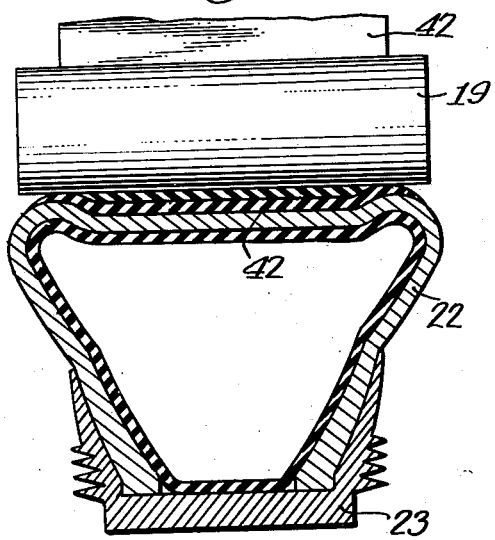
Fig. 3 is a sectional view of the tire, showing somewhat diagrammatically the flattening of the tire at the point where the camelback is applied to the periphery under flattening pressure.
Figure 4:
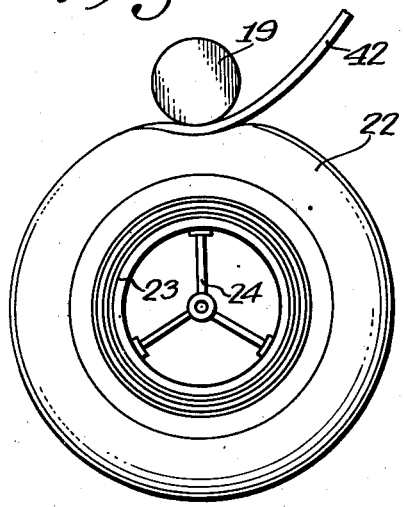
Fig. 4 is a diagrammatic side view, showing the feeding and application of the camelback to the tire periphery.
Figure 5:
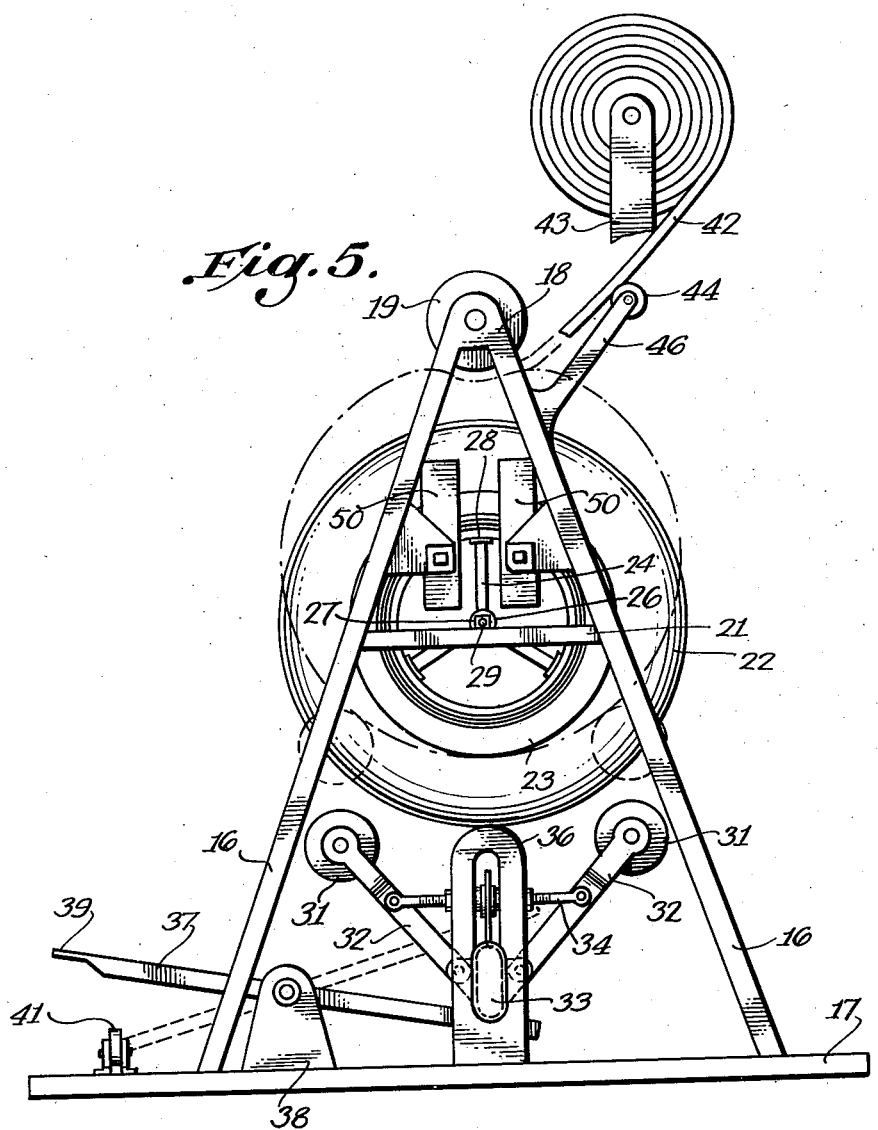
Fig. 5 is a front view of said apparatus.

The herein device is adapted to be used in connection with tires where the accurate balancing of the tires is of importance. Such balancing at the present is particularly important in connection with airplane tires, which by reason of the transverse curvature of their traction surface present the additional problem of applying the new tread material smoothly across the entire traction surface and also all around the tire periphery under proper tension. In my method, the tire is first buffed around its periphery so as to be suitably roughened to receive the tread rubber. After the tire is thus prepared it is tested for balance by supporting it on supports of very small frictional resistance, and is then balanced by applying suitable pieces of tread rubber to such parts of its traction surfaces which may require this added mass for the accurate balance of the tire. Then suitable cement is applied to the roughened periphery of the tire. The tire is provided with the usual inner tube, mounted on a rim and is inflated. Then camelback is applied at one portion of the tire periphery under such pressure that the tire periphery is transversely flattened for a substantial flat surface contact with the camelback. Then this pressure point is circumferentially shifted on the tire periphery in such a manner as to gradually wrap the camelback around the tire periphery, always keeping the respective portion of the tire where the camelback is fed to it in flattened condition. The remaining portions of the tire periphery are permitted to assume their substantially normal position under inflation. The camelback is fed substantially tangentially to the tire periphery and the only portion of the tire periphery which is flattened is the place where the camelback is fed thereunto. In other words, at the transverse line where the portion of the camelback first contacts the tire periphery, the contact is made under pressure sufficient to flatten the tread surface of the tire. The pressure is applied externally upon the camelback and against the internal pressure of the tire. The area of flattening is shifted circumferentially around the periphery of the tire at the rate the camelback is applied and the remaining areas of the tire are permitted to round out under the force of inflation. After the camelback is applied all around the tire, the tire is again tested and balanced by additional rubber diametrically opposite the heaviest unbalanced parts.

The illustrative embodiment of my apparatus herein includes a frame formed by a pair of standards 16 spaced from each other and supported on any suitable base 17. In the present form, the standards are open frames having upwardly converging sides, at the apex of which is a journal 18 in which is mounted a pressure roller 19 transversely between the frames 16. Spaced from the journal 18 to a distance greater than the largest tire that may be handled in the apparatus are knife-edge balancing rails 21. These rails 21 are parallel. There is a rail 21 in each frame extending substantially at right angles to the axis of the roller 19. The knife-edge of each of the rails 21 is its upper horizontal edge so that a tire with suitable supports may be balanced thereon. It is to be noted that each rail 21 is of sufficient length to allow considerable rolling and play of the tire in the apparatus for the purpose of determining the balance of the tire.

A tire 22 is suitably prepared, and then mounted on a suitable rim 23, which in the present illustration is a regular curing rim of the type having flanges extending up on the sides of the tire to about the widest portion of the tire. Inside of this curing rim 23 are provided a pair of spiders 24 spaced from each other axially with respect to the rim 23. The arms or webs of the spiders 24 intersect each other at the axis of the rim 23. A central hub 26 is formed in each of said spiders 24. A shaft 27 extends through the hubs 26 of the spiders 24. The outside ends of the arms of the spiders 24 are provided with arcuate shoes 28 which conform to and suitably engage the inner surface of the rim 23. The outer ends of the shaft 27 are formed into balancing pins 29 of comparatively small diameter. The length of the shaft 26 is so related to the distance between the frame members 16 that the balancing pins 29 of the shaft 27 rest and ride upon the upper knife edges of the opposite rails 21.

The roller 19 may be so mounted in the frames 16 as to be movable under pressure against the top of the tire 22. In the present preferred form, however, means are provided for pushing the tire up against the roller 19 to apply the necessary flattening pressure and also to suitably align and center the tire with respect to the roller 19. For this purpose, a pair of spaced pressure rollers 31 are supported on arms 32 transversely of the tire periphery and so spaced as to engage the tire periphery and hold the tire accurately centered against the top roller 19. The supporting arms 32 for these rollers 31 are pivotally joined to a sliding block 33, which latter in turn is guided in a vertical guide bracket 36 on a path which is in alignment with the center of the roller 19. In this illustration the arms 32 are also suitably anchored by an adjustable stay 34 whereby the distance between the rollers 31 may be varied. To accomplish the easy movement of the rollers 31 against the tire 22 for lifting the tire 22 and for pressing it against the top roller 19, a foot lever 37 is provided. This foot lever 37 is pivoted on a bracket 38. One end of this lever 37 is pivoted to the sliding block 33. The other end of this foot lever 37 is provided with a suitable foot pedal 39 so that when the operator steps on the foot pedal 39 that will move the block 33 upwardly, so as to force the rollers 31 against the tire 22. The tire shifts between the rollers 31 until it is properly centered and aligned with the pressure roller 19. Further pushing down of the foot pedal 39 exerts the pressure to press the tire 22 against the top roller 19 with sufficient force to accomplish the desired flattening of the portion of the tire which is opposite the roller 19. A releasable latch 41 is provided on the base 17 and can be swung over the foot lever 37 so as to fasten the foot lever in the depressed position where the tire 22 is flattened against the roller 19. The positions of roller 31 can be changed to accommodate tires of various sizes by adjusting the length of the stay 34. It is understood, however, that the same adjustment when needed might be performed by other devices such as by locking the lever 37 in various depressed positions corresponding to the diameters of the tires treated.

Figure 6:
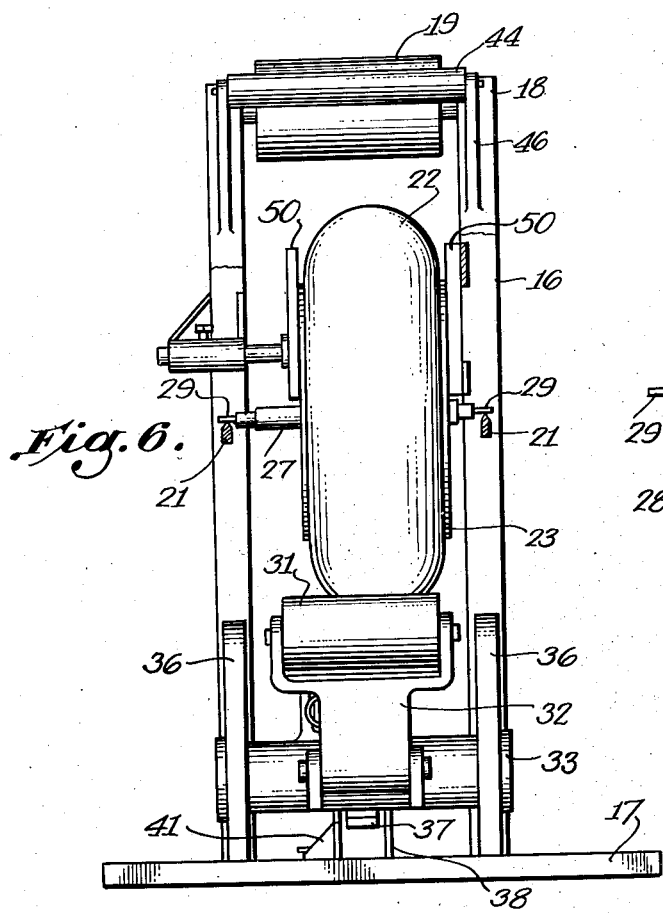
Fig. 6 is a side view of an apparatus for balancing the tire and for applying the camelback to the tire.
Figure 7:
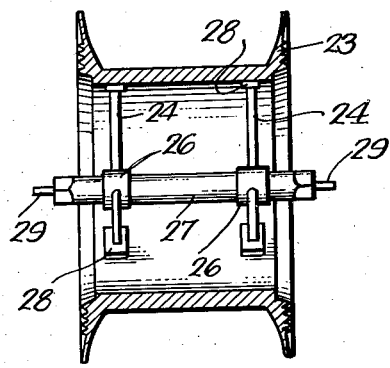
Fig. 7 is a detailed view of a tire rim on which the tire is supported, showing the balancing and journal devices in the rim.

The camelback 42 is usually supplied in a reel which is journaled or supported on a suitable journal bracket 43. This bracket may be supported on a separate support or the bracket 42 may be extended from the standards 16 of the apparatus. A guide roller 44 is supported on arms 46 on the standards 16 so that it is slightly above but parallel with the center line of the roller 19, and guides the camelback 42 from the reel to under the roller 19. Then as either the roller 19 or the tire 22 is rotated, the camelback 42 is fed and applied to the periphery of the tire 22. In the present illustration the tire would be rotating during this operation in a counter-clockwise direction, viewing Fig. 6.

While the rollers 31 normally may be sufficient to support a tire in a vertical position as it is pressed against the pressure roller 19, yet in some instances it may be necessary to prevent the lateral tilting of the tire. For this purpose a guide 50 is extended inwardly from each side of the frame 16. One of these guides 50 is suitably adjustable to accommodate tires of various sizes as to width. The guides 50 are so spaced that the opposite sides of the hub or the opposite sides of the tire, as the case may be, are in light sliding engagement therewith so as to permit the unobstructed lifting and lowering of the tire toward and away from the top roller 19 but prevent sidewise tilting of the tire out of the vertical plane.

Figure 8:
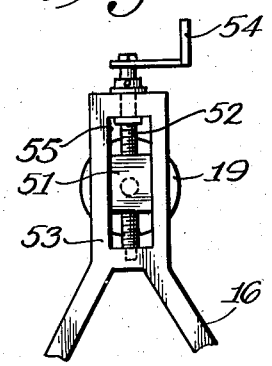
Fig. 8 is a fragmental view of a modified arrangement of the pressure roller support in my apparatus.

In the modified form of the apparatus, shown in Fig. 8, the roller 19 is supported on sliding journal boxes 51, each of which travels on a threaded shaft 52. The threaded shafts are journaled in a head 53 on the top of each standard 16 and are provided with a suitable handle 54 for facilitating the adjustment. The sliding blocks 51 are guided in guide slots 55 in said heads 53. In this device pressure can be applied by evenly adjusting the opposite journal boxes 51 by the rotation of the shafts 52, and thereby moving the roller 19 against the periphery of the tire 22 with the required pressure.

Figure 9:
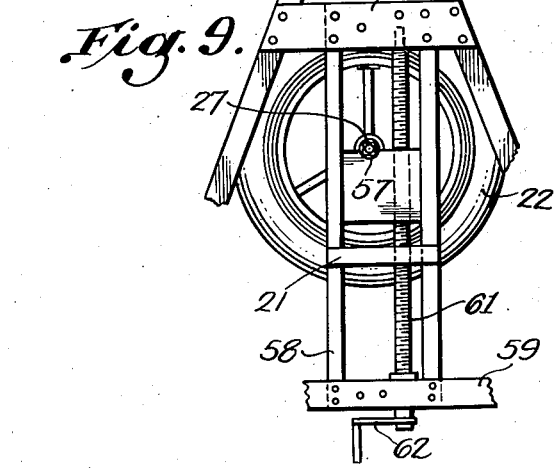
Fig. 9 is a fragmental view of a modified arrangement for the adjustment of the tire relatively to the pressure roller.
Figure 12:
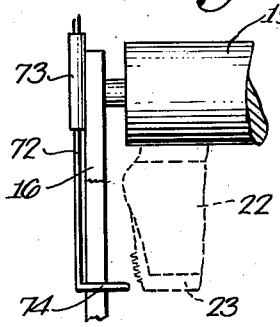
Fig. 12 is a fragmental view showing the deflection measuring device on the apparatus.

In the modified form of the apparatus shown in Fig. 9 the tire 22 is lifted by vertically sliding blocks 56, each of which has a journal seat 57 in its top. The ends of the shaft 27 are rotatably supported on the seats 57. Each of these sliding blocks 56 is guided between vertical guides 58 suitably supported on transverse braces 59 on the converging sides of the standards 16. Through each block 56 extends a screw shaft 61, the opposite ends of which are journaled in their respective horizontal braces 59. A suitable handle 62 on the lower end of the screw shaft 61 facilitates the turning of the screw shaft in either direction. When the screw shaft 61 is turned, its threaded engagement with the sliding block 56 will move the sliding block toward, to or away from the roller 19, according to the direction in which the screw shaft 61 is turned. The sliding blocks 56 are off-set inwardly of the transverse balancing rails 21, which latter in this form are secured to the outside of the vertical guides 58. When the sliding blocks 56 are lowered to below the level of the top edges of the balancing rails 21, then the pins 29 at the ends of the shaft 27 are permitted to rest and freely roll upon the knife edges of the rails 21. After balancing the tire the sliding blocks 56 are raised by turning the screw shaft 61 so as to engage the shaft 27 in said seats 57, thereby the tire 22 is lifted and pressed against the roller 19. For simplicity of illustration, the handle 62 is shown herein for the manual turning of the screw shaft 61, but other suitable means may be used for rotating the screw shaft 61.

In the operation of the apparatus herein described, the tire 22 is provided with an inner tube mounted on the rim 23 with suitable balancing or journal spiders 24 therein. The tire is then inflated. The tire 22 is buffed or roughened on its periphery. The tire is then allowed to freely roll on its balancing pins 29 on the knife edges of the rails 21. The free rolling of the tire on the rails 21, which are truly horizontal will indicate the heaviest parts of the tire and then small patches or strips of camelback are cemented on the lighter sides of the tire, until the tire is balanced so that it remains stationary in any position upon the rails 21. Then the inflated tire with cement on its outer periphery, is brought to close proximity of the top roller 19 and the end of the camelback 42 is positioned between the roller 19 and the periphery of the tire 22. Then the flattening pressure is applied in the manner heretofore described so as to flatten the tire against the end of the camelback 42. Then by rotating the tire, or by rotating the roller 19, the periphery of the tire 22 is successively brought into pressure contact with the camelback 42 under the roller 19. This operation is continued until the entire periphery of the tire is wrapped into the strip of camelback 42. Then the camelback 42 is suitably cut so that its ends on the tire are joined. The tire then is again lowered onto the balancing rails 21 and in the event of any unbalanced portion the same is suitably corrected by applying some rubber at points diametrically opposite to the heaviest portions of the tire periphery. The tire thus prepared is placed in any suitable mold for the curing of the camelback so as to vulcanize the same integrally to the tire periphery into the desired traction surface.

Figure 11:
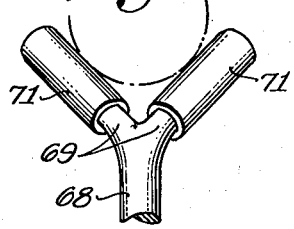
Fig. 11 is a detail view of the supporting rollers of said modified form.
Figure 10:
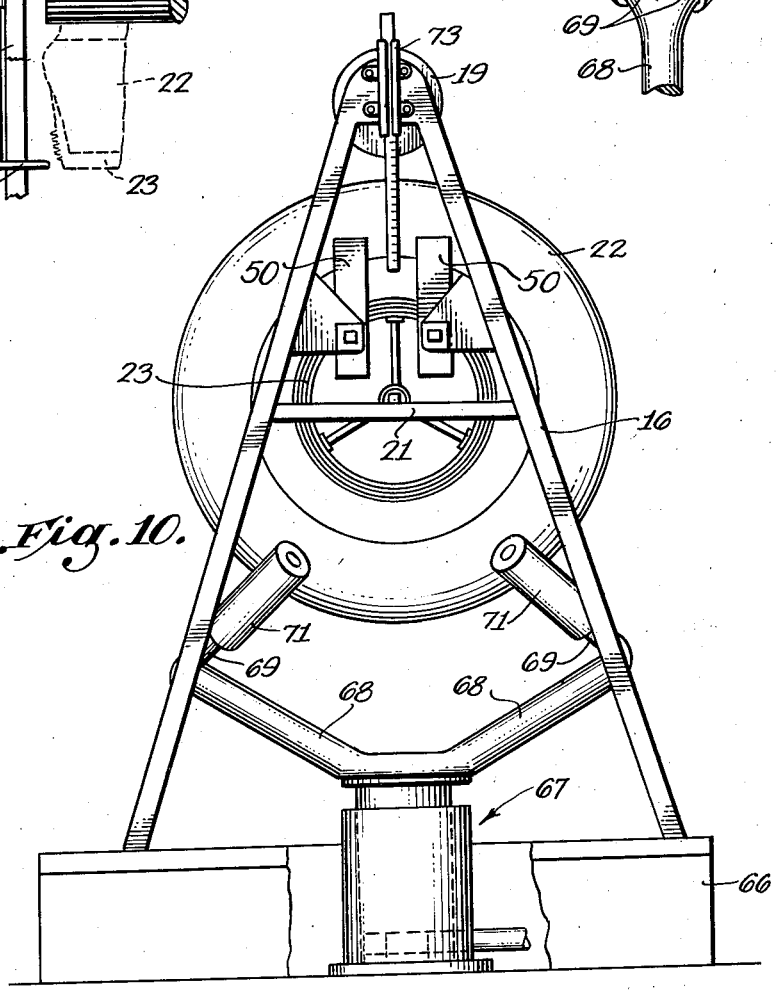
Fig. 10 is a modified form of my apparatus.

In the modified embodiment of my invention shown in Figs. 10 and 11, another form of support for the tire 22 in the apparatus is provided for holding the tire in a balanced position. The standards 16 in this form are preferably supported on a deeper base 66, in which is a central hydraulic ram 67 of the usual type. On this ram are supported a pair of lateral arms 68 which extend substantially transversely and on an upward incline between the standards 16. The end of each arm 68 is forked, the prongs 69 of which extend on an incline into the space between the standard 16 and toward the respective opposite standards 16 on each side of the tire. In other words, the prongs 69 on each arm 68 are divergent and are on an upward incline, but the sets of prongs 69 on the opposite arms 68 converge toward each other. This is accomplished by bending the end of each arm 68 toward the position of the tire 22 between the standards 16. On each prong 69 is a supporting roller 71. The tire 22 wedges itself between the rollers 71, but by reason of the substantially tangential contact of the shoulders or sides of the tire 22 with the rollers 71, the tire 22 can be easily rotated. As the tire 22 is rotated, it rotates the rollers 71, yet it is securely supported in the opposite roller forks. This opposite fork support of the tire will maintain the tire in substantially vertical position. The tire is raised and lowered by the raising and lowering of the ram 67, the pressure in which latter is controlled and manipulated in any suitable manner not shown.

In this form, I also illustrate a use of the device for determining and marking the deflection line on the tire 22. Tires are usually so inflated that under a specified load the tire will be compressed to a given percentage of its height. In order to facilitate the inflation of such tires to the desired pressure, the percentage of specified deflection is indicated by a circular marking around the tire, and the tire is inflated under a given load to be flattened to the deflection mark indicated on the tire. The marking and measuring of a specified percentage of deflection involved in the past a separate and complicated operation. In my apparatus, I provide a scale 72 which is frictionally held in its adjusted positions in a guide 73 at the apex of one of the standards 16 in such position that the scale 72 is in registry with and parallel to the vertical diameter of the pressure roller 19 and of the tire 22. The lower end of the scale 72 is bent inwardly to form an indicator 74 for the rim flange position of the tire 22. Inasmuch as the desired deflection is specified usually in percentages, the marking of the tire is accomplished in my apparatus by quickly calculating the percentage on the scale 72. The tire is first brought into contact with the roller 19 without compressing it. Then the scale 72 is pushed in its guide 73 to a position where the indicator 74 is aligned with the rim 23 of the tire. Then a reading is taken on the scale 72 to the lowest point of the roller 19, which shows the expanded height of the tire. Then from that the desired percentage of deflection is calculated and deducted. The normal inflated vertical distance from the rim flange to the supporting surface of the tire is considered in present specifications for airplane tires for landing wheels, as the distance equivalent to 100% deflection. The specifications under a normal load specify a vertical deflection at the proper pressure for said load of 35%. After the 35% of said distance as shown on the scale is determined, the scale 72 is pushed up toward the roller 19 so as to deduct this 35% from the scale length below said roller 19, namely, so that the marker 74 assumes a position with the indicator 74 35% above its previous position. Then the tire 22 is pressed against the roller 19 until the rim flange 23 is in alignment with the indicator 74. In this last position the tire is compressed to the desired 35% deflection. Then by applying paint, chalk or the like to the shoulder or side of the tire at about the point where it turns to its flattened tread surface at the roller 19, and then by rotating the tire 360°, an accurate circular marking is obtained. Finally this marking is covered with indelible paint or the like and forms the permanent desired deflection marking on the tire.

I claim:

1. In an apparatus for placing a strip of tread material around the traction periphery of a tire, a frame having a space therein for said tire in inflated condition, a roller element on the frame disposed transversely outside of the tire periphery, pressing means to exert force to the outside of the tire opposite from said roller element so as to lift said tire toward said roller and press said tire against said strip of tread material under said roller with sufficient force to flatten the portion of the traction surface of the tire at said roller to about the same width as the width of said strip of tread material, and side guides on the frame at the opposite sides of said tire slidably holding said tire at a constant angle to said roller.

2. In an apparatus for wrapping a strip of tread material around the traction periphery of a tire, a frame having a space therein for the inflated tire, a rotatable element on the frame disposed transversely outside of the tire periphery, members outside of the tire adjustable with respect to the frame determining the relative spacing between the tire and said rotatable element, a mechanism whereby force is applied to said members for creating a pressure contact between said rotatable element and said inflated tire so as to transversely flatten the portion of the inflated tire opposite said rotatable element to about the same width as that of the strip of tread material, said strip of tread material being inserted between said rotatable element and the flattened portion of said tire periphery, opposed balancing elements arranged on said frame at about right angles to the axis of the tire, and a balancing extension connected to the hub of the tire and adapted to freely rest on said balancing elements and freely to support the tire thereon when the tire is out of contact with said rotatable element.

3. In an apparatus for wrapping a strip of tread material around the traction periphery of an inflated tire, means to rotatably support said inflated tire, a roller element supported transversely to the periphery of the tire, means to adjust the position of said roller element with respect to said tire and to press said roller element against the adjacent portion of said tire periphery so as to flatten said portion of the tire periphery to substantially the same width as that of said strip of tread material, and means to guide said strip of tread material endwise between said roller element and said tire.

4. In an apparatus for wrapping a strip of tread material around the traction periphery of an inflated tire, a frame, a rotatable pressure element on the frame, and means to hold the tire in position against said rotatable element, said holding means comprising two pairs of opposed rollers, the rollers in each pair diverging from each other and the opposed pairs of said rollers converging toward the middle of the tire, so as to form forked supports with the rollers tangential to the contacting shoulders and sides of the tire.

5. In an apparatus for wrapping a strip of tread material around the traction periphery of an inflated tire, a frame, a rotatable pressure element on the frame, and means to hold the tire in position against said rotatable element, said holding means comprising two pairs of opposed rollers, the rollers in each pair diverging from each other and the opposed pairs of said rollers converging toward the middle of the tire, so as to form forked supports with the rollers tangential to the contacting shoulders and sides of the tire, and means to raise and lower said pairs of rollers together.

THOMAS P. BACON, Jr.

REFERENCES CITED

The following references are of record in the file of this patent:

UNITED STATES PATENTS

| Number | Name | Date |
|---|---|---|
| 2,009,643 | Woock | July 30, 1935 |
| 2,150,650 | Errig | Mar. 14, 1939 |
| 2,254,588 | Breth | Sept. 2, 1941 |
| 2,276,687 | Cleveland et al. | Mar. 17, 1942 |